July 28, 1942. A. R. REISS 2,291,561
SPRING TESTING APPARATUS
Filed April 15, 1941
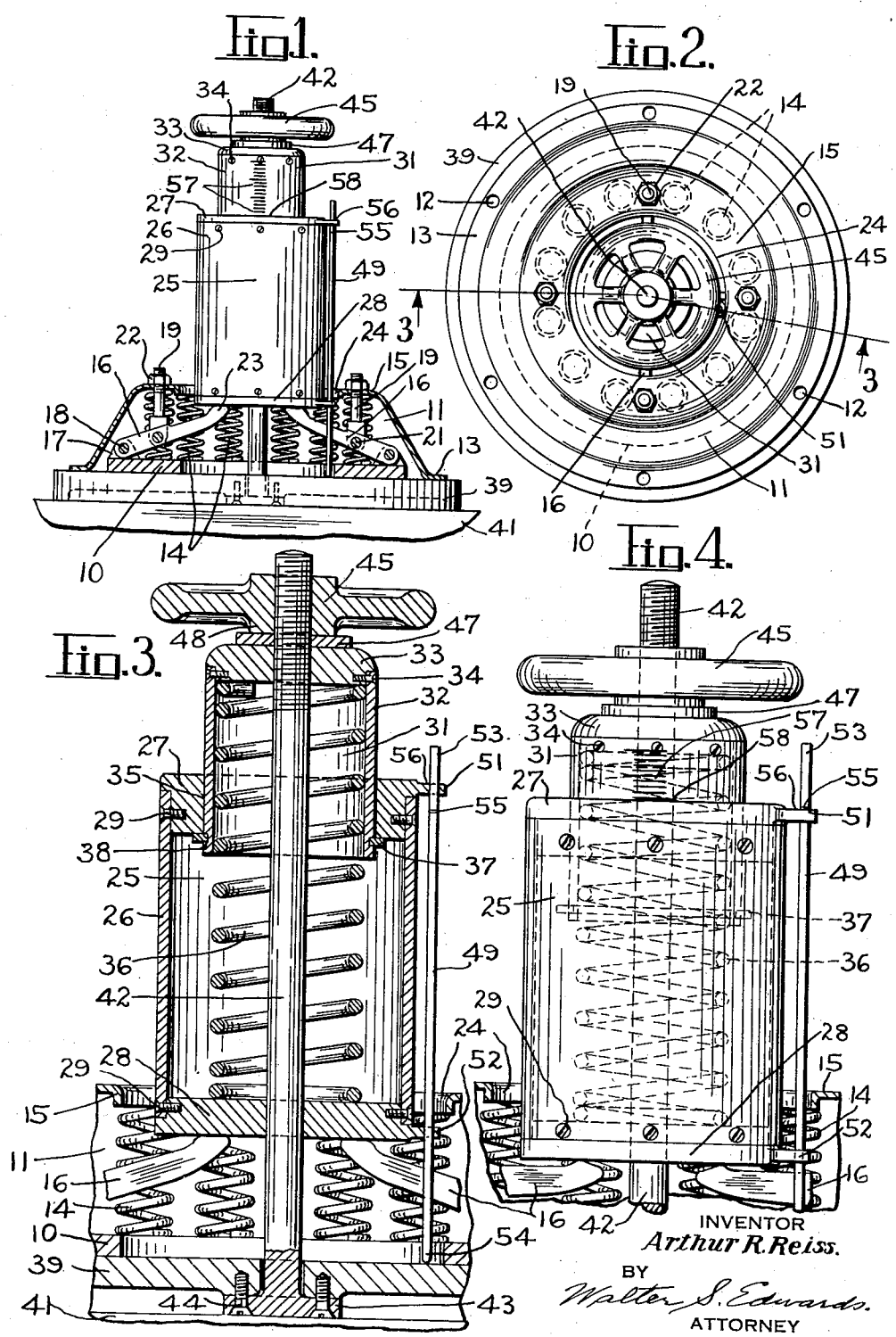
INVENTOR
*Arthur R. Reiss.*
BY
*Walter S. Edwards.*
ATTORNEY Patented July 28, 1942

2,291,561

UNITED STATES PATENT OFFICE 2,291,561

SPRING TESTING APPARATUS

Arthur R. Reiss, West Haven, Conn.

Application April 15, 1941, Serial No. 388,592

7 Claims. (Cl. 265—18)

This invention relates to improvements in a spring testing apparatus and more particularly to apparatus for testing the compression tension of coiled springs used in spring-actuated clutches, such as those used in automobiles.

Clutches used in automobiles are usually actuated by a plurality of springs disposed and reacting between a pressure plate and a domed casing to which the pressure plate is connected by clutch operating levers arranged to be pressed inwardly to draw the plate inwardly in respect to the casing and away from other parts to release the clutch. Being enclosed and constantly under tension it is difficult and time-consuming to remove the springs to individually test them in respect to their compression tension and resistance. It is therefore contemplated as one object of this invention to provide an improved spring tester by the use of which the compression tension and resistance of the springs in such a clutch may be tested without disassembly of the springs from the same.

Another object is to provide in spring testing apparatus of the above nature means to indicate the desired amount the springs being tested are compressed in combination with means to indicate the amount of tension, or resistance, of the springs when so compressed.

A further object is to provide an improved spring testing apparatus which will be relatively inexpensive to manufacture, simple in construction, and which is very efficient and durable in use.

With these and other objects in view, which will appear as the description proceeds, there has been illustrated in the accompanying drawing, one form in which the features and principles of this invention may be conveniently embodied in practice.

In the drawing, wherein like reference numerals designate like parts throughout the several views:

Figure 1 is a front elevational view of a spring tester embodying the features and principles of this invention shown in operative position in association with a clutch of a form having springs to be tested;

Figure 2 is a top plan view of the same;

Figure 3 is an enlarged sectional view of the spring testing apparatus taken on the line 3—3 of Figure 2; and Figure 4 is a front view of the apparatus when in operative position to indicate the amount the springs tested are compressed and to indicate the amount of compression tension or resistance of these springs.

In order to clearly illustrate the features and principles of the improved spring testing apparatus of this invention the pertinent parts of a conventional form of automobile spring actuated clutch are shown in the drawing. Such a clutch includes a movable clutch part or pressure plate 10 enclosed by a casing 11 adapted to be assembled to adjacent clutch parts by bolts passed through holes 12 provided in its peripheral flange 13. The plate 10 is normally pressed away from the casing 11 and into contact with another cooperating clutch part (not shown) by a plurality of coiled compression springs 14 disposed and reacting between the pressure plate 10 and the interior surface of the end wall 15 of the casing 11. A plurality of levers, or clutch operating fingers 16 are provided to draw the pressure plate 10 into the casing 11 to release the clutch by disengaging the plate from the other and cooperating clutch part, or parts.

The levers 16 are pivoted to lugs 17 formed on the inner surface of the plate 10 by pins 18 which pass through the lugs 17 and the lower ends of the levers 16. The levers 16 are connected to the casing 11 by studs 19 which are pivoted to the levers 16 intermediate their ends by pins 21 and extend upwardly through the casing 11 and have nuts 22 screw-threaded upon their upper ends outside of the casing end wall 15. The free ends 23 of the levers 16 are arranged to lie below the end wall 15 in a relatively large opening 24 therein in position to be engaged by a clutch operating member (not shown) but adapted to be pressed against the free ends 23 of the levers 16 to actuate the clutch to release the plate 10 from its cooperating clutch part, or parts. Pressure on the ends 23 of the levers 16, inwardly, will pivot them on the pins 21 in the studs 19 to draw the plate 10 into the casing 11 against the tension of the springs 14.

Occasionally a spring 14 will become broken or weakened by constant use. If one of the springs 14 is broken this condition may be readily ascertained by observation through the opening 24 in the casing 11, but the weakened condition can only be ascertained by testing each spring separately and this means the disassembly of the above described assembled and cooperating clutch parts constituted by the plate 10, the casing 11, the levers 16 and the springs 14. Disassembly of these parts is laborious and time-consuming, thus being expensive. Should the springs be found of proper tension after disassembly and individual testing the time and labor of so doing is wasted.

In view of the above the improved apparatus of this invention has been developed to test the combined compression tension, or resistance, of the springs while they are in assembly with the casing 11 and the plate 10. The illustrated form of apparatus for so doing is shown herein as including a cylinder 25 comprising a cylindrical shell 26 with upper and lower heads 27 and 28 respectively which may be fastened at the respective ends of the shell 26 by screws 29. A plunger 31 comprising a cylindrical shell 32 having an upper head 33 secured therein by screws 34 is slidable in an opening 35 provided in the head 27 of the cylinder 25. A relatively heavy coiled compression spring 26 under tension is disposed in the cylinder 25 and the plunger 31 to react between the lower head 28 of the cylinder 25 and the head 33 of the plunger 31. The plunger 31 being restrained from upward movement out of the cylinder 25 by a spring collar 37 set in a groove 38 in the lower end of the shell 32 and overlying the undersurface of the upper head 27 of the cylinder 25.

A base plate 39, adapted to be seated on a stationary table, or the like, 41 is provided and has a rod 42 secured at its lower end 43 to the base plate 39 by screws 44. The rod 42 extends upwardly through the cylinder 25 and the plunger 31. The end portion of the rod 42 is screw-threaded to receive a nut 45 preferably in the form of a hand wheel which is internally screw-threaded to receive the same. A washer 47 may be disposed on the rod 42 between the head 33 of the plunger 31 and the hub 48 of the hand wheel 45. Another rod 49 extends alongside of the cylinder 25 passing freely through lugs 51 and 52 extending outwardly from the heads 27 and 28 respectively and provided for the purpose of supporting and guiding the rod 49. The rod 49 is of sufficient length to have its upper end 53 extend above the lug 51 when its lower end 54 is resting on the base plate 39.

When in position for the testing of the springs 14 of a clutch such as disclosed herein the base plate 39 is seated upon the table 41 with the rod 42 extending upwardly, the clutch assembly constituted by the pressure plate 10, the casing 11, the springs 14 and the levers 16 is slipped down over the rod 42 to be seated on the base plate 39. The cylinder 25 and plunger 31 assembly is then slipped downwardly over the rod 42 and through the opening 24 in the casing 11 to seat the lower head 28 of the cylinder 25 upon the free ends 23 of the levers 16. The hand wheel 45 is now screw-threaded onto the rod 42 to be moved downwardly thereon to press against the head 33 of the plunger 31 through the washer 47 which was previously slipped onto the rod 42 above the plunger head 33. The rod 49, when the apparatus parts are in position as above described has its lower end 54 resting on the base plate 39 and its upper end 53 extending above the lug 51 on the upper cylinder head 27.

The hand wheel 45 is now screw-threaded downwardly on the rod 49 to force the cylinder 25 downwardly, through the instrumentality of the plunger 31 and the heavy coiled spring 36, upon the finger, or lever, ends 23 to compress the springs 14. This action is continued until an indicating mark 55 provided adjacent the upper end 53 of the rod 49 is in alignment with an indicating mark, or point, 56 on the cylinder 25, herein constituted by the upper surface of the upper lug 51, extending from the upper head 27. When this operation has been accomplished, whereby the amount the springs 14 are compressed will be indicated and readily ascertained by comparing the marks 55 and 56 and which has been previously determined as the proper amount of compression for the clutch springs being tested, the compression tension, or resistance, of the springs may be ascertained by comparing a mark of a plurality 57 thereof provided on the plunger 31 with a mark, or point 58 provided on the cylinder 25, herein constituted by the upper surface of the upper head 27 of the cylinder 25. The marks 57 on the plunger 31 may be calibrated to read in pounds, or like designations, or may be used for the purpose of comparison with readings ascertained by the testing, as above, a clutch having known spring tension characteristics and which is acceptable for use as designed, for instance a new clutch of the type being tested.

From the above it will be understood that the apparatus of this invention is both time and labor saving in the inspection and testing of the springs of a clutch and is particularly efficient and durable in use while being relatively inexpensive to manufacture and simple in construction.

While there has been shown and described herein an improved form of spring testing apparatus, it is to be understood that the invention may be embodied in other forms without departing from the spirit and essential attributes thereof. It is therefore desired that the present embodiment be considered in all respects as illustrative and not restrictive, and it will be further understood that each and every novel feature and combination thereof, present in, or possessed by, the apparatus herein disclosed, forms a part of the invention included in this application.

What is claimed as new and for which it is desired to secure Letters Patent, is:

1. Apparatus for testing the springs of spring actuated devices having a plurality of springs under tension confined between opposing members and fingers adapted to draw the members together against spring tension comprising, in combination, a bed plate for supporting a said device, a cylinder having its lower end resting upon said fingers to actuate them by downward pressure thereon, a plunger slidable in said cylinder, a relatively heavy compression spring reacting between said cylinder and said plunger, means to press said plunger downwardly into said cylinder to press said cylinder, through said compression spring, upon said fingers to actuate them and draw the members together against spring tension, means to indicate a predetermined amount the cylinder is to be pressed downwardly, and marks on said plunger comparable with a point on said cylinder to indicate the amount the springs in said device are compressed when said cylinder is pressed downwardly the predetermined amount shown by said indicating means.

2. Apparatus for testing the springs of spring actuated devices having a plurality of springs under tension confined between opposing members and fingers adapted to draw the members together against spring tension comprising, in combination, a bed plate for supporting a said device, a cylinder has a lower end adapted to rest upon all of said fingers to actuate them in unison by downward pressure thereon, a plunger slidable in said cylinder, a relative heavy compression spring reacting between said cylinder and said plunger, means to press said plunger downwardly into said cylinder to press said cylinder, through said compression spring, upon said fingers to actuate them and draw the members together against spring tension, a rod slidably supported on said cylinder and having its lower end seated on said bed plate, and a mark adjacent its upper end for comparison with a point on said cylinder to indicate a predetermined amount the cylinder is to be pressed downwardly, and marks on said plunger comparable with a point on said cylinder to indicate the amount the springs in said device are compressed when said cylinder is pressed downwardly the predetermined amount shown by the mark on said rod in comparison with the associated point on said cylinder.

3. In apparatus for testing springs, a cylinder, a plunger in said cylinder, a spring reacting between said cylinder and said plunger to bias said plunger in said cylinder in one direction, a base plate upon which the spring to be tested is seated to be acted upon by the lower end of said cylinder to compress it against said plate, an indicating mark on said cylinder, a rod slidably supported by said cylinder and having an end resting on said base plate, a mark on said rod for comparison with the mark on said cylinder to indicate the amount of compression of the spring being tested, means to move the plunger in respect to said cylinder and against the tension of the spring reacting therebetween, and means to indicate the amount the plunger is so moved in respect to the cylinder.

4. In apparatus for testing springs, a cylinder, a plunger in said cylinder, a spring reacting between said cylinder and said plunger to bias said plunger in said cylinder in one direction, a base plate upon which the spring to be tested is seated to be acted upon by the lower end of said cylinder to compress it against said plate, an indicating mark on said cylinder, a rod slidably supported by said cylinder and having an end resting on said base plate, a mark on said rod for comparison with the mark on said cylinder to indicate the amount of compression of the spring being tested, means to move the plunger in respect to said cylinder and against the tension of the spring reacting therebetween, indicating marks on said plunger, and a mark on said cylinder comparable with the marks on said plunger to indicate the amount of relative movement therebetween.

5. In apparatus for testing springs, a cylinder, a plunger in said cylinder, a spring reacting between said cylinder and said plunger to bias said plunger in said cylinder in one direction, a base plate upon which the spring to be tested is seated to be acted upon by the lower end of said cylinder to compress it against said plate, a rod secured to said base plate and extending upwardly through said cylinder and said plunger and being screw-threaded at its upper end, a nut cooperating with the upper screw-threaded end of said rod and engaging said plunger to force it to move in respect to said cylinder against the tension of the biasing spring reacting therebetween, an indicating mark on said cylinder, a rod slidably supported by said cylinder and having an end resting on said base plate, a mark on said rod for comparison with the mark on said cylinder to indicate the amount the spring being tested is compressed, indicating marks on said plunger, and a mark on said cylinder comparable with the marks on said plunger to indicate the amount of relative movement therebetween.

6. Apparatus for testing the springs of a spring actuated clutch having a plurality of springs confined under tension and reacting between a pressure plate and a casing part, and operating members adapted when pressed to draw the pressure plate toward the casing part against the tension of the springs reacting between the same, comprising, a stationary member upon which the pressure plate is supported, a cylinder having its lower end resting upon the operating members to actuate them by pressure thereon, a plunger slidably mounted in said cylinder, a relatively heavy compression spring under tension disposed and reacting between said cylinder and said plunger, means to press said plunger downwardly against the tension of said spring to press said cylinder down against the operating members to actuate them and simultaneously compress the springs in said clutch, means to indicate the amount said springs are compressed, and means to indicate the relative movement between said plunger and said cylinder.

7. In apparatus for simultaneously testing a plurality of springs confined between opposed members having lever elements adapted to draw them together against the tension of said springs, a first member engaging the lever elements to actuate them by pressure thereon, a second member movable in respect to the first member, spring means reacting between said first and second members to bias them apart, means to move said first and second members against the spring reacting therebetween to press the first member against the lever elements to simultaneously compress the springs being tested, a stationary member to support the said springs being tested, a rod slidably supported by said first member and having its lower end resting on said stationary member, a mark on the rod for comparison with a mark on said first member to indicate the amount said springs being tested are compressed, indicating marks on said second member, and a mark on said first member comparable with the marks on said second member to indicate the relative movement between the first and second members.

ARTHUR R. REISS.